May 16, 1967    L. J. O'BRIEN    3,319,712

SECONDARY OIL RECOVERY METHOD

Filed April 6, 1965

INVENTOR.
LEO J. O'BRIEN
BY
ATTORNEY.

United States Patent Office 3,319,712
Patented May 16, 1967

---

3,319,712
SECONDARY OIL RECOVERY METHOD
Leo J. O'Brien, Crystal Lake, Ill., assignor, by mesne assignments, to Union Oil Company of California, Los Angeles, Calif., a corporation of California
Filed Apr. 6, 1965, Ser. No. 445,898
10 Claims. (Cl. 166—2)

The present invention broadly pertains to an oil recovery method for obtaining petroleum from subterranean oil-bearing formations which are characterized as having a free gas cap and preferably, but not necessarily, wherein the oil-bearing portion of the formation has a dip of about 15°. The formation upon which this invention may be practiced is further characterized as one which is subject to the continuous influx of fluids.

The production of oil from subterranean formations concomitant with conserving the natural formation energy and the maintainence of a gas cap is a formidable problem for which various solutions have been proposed. An improved method of secondary oil recovery for such a formation is disclosed in U.S. copending application, Ser. No. 369,116, filed May 21, 1964, now U.S. Patent No. 3,288,212, of which the instant inventor is also a coinventor. In the aforementioned application is disclosed a method wherein water is injected into the approximate vicinity of the gas cap or gas-oil interface, thereby providing an effective water block or dam which prevents the expansion of the gas from the gas cap portion of the reservoir into the oil-bearing portion of the formation, and, conversely, inhibits the flow of oil from the oil rock to the gas-bearing portion of the reservoir. In such a system, where the formation or reservoir is subject to the introduction of water at the gas-oil interface, the use of effective solvent recovery techniques is limited because of the poor sweep efficiency for limited areas of the formation contacted by the solvent. If an injected solvent can be made to penetrate and contact a greater portion of the oil-bearing formation into which it is injected, more oil will be produced per volume of solvent injected, thereby making it practical to continue production.

The essence of the invention in the aforementioned copending application lies in withdrawing a portion of the fluid (injected to maintain the gas in the gas cap area) from a number of wells downstream from the oil-gas interface but upstream from the solvent injection well. By this technique, a pressure gradient is created in the area of the solvent injection well, thereby causing a greater radial flow of the solvent whereby a larger portion of the reservoir is swept with a consequently improved production of oil at the production well or wells.

It has now been found that the aforedescribed process can be improved upon by using as solvent injection wells a number of wells located downstream from the gas-oil interface, but upstream from the production wells. However, only alternate wells in a row of wells are used as the solvent injection wells. The remaining wells in the row are left open to produce fluids until a trace of the solvent injected into the solvent injection wells is noted in the effluent. Thereafter, these remaining wells are shut in and the solvent is driven through the formation towards the production well either by the subsequent injection of a driving fluid or by shutting in the injection wells and ceasing injection of fluids at the oil-gas interface, thereby allowing the gas in the gas-cap portion of the reservoir to expand into the oil-bearing portion of the reservoir and push water and other fluids before it to impart a driving force to the solvent previously injected.

An object of the invention is to provide an improved oil recovery method whereby additional oil is recovered from an oil-bearing formation with the recovery of a minimum amount of the gas content of the reservoir. Another object of this invention is to provide a method whereby an entire oil field is effectively produced.

It is also an object of the invention to provide a method of improved solvent recovery wherein it is desired to conserve the inherent energy of an oil- and gas-bearing formation or reservoir. A further object of this invention is to provide a method whereby a continuous band of solvent is established across or coextensive with the confines of the oil-bearing portion of a reservoir to achieve greater oil recoveries than have been heretofore possible. It is still another object of this invention to provide a method of producing a formation having a dip of less than 15° where said formation has a gas cap and wherein the gas from said gas cap is utilized in part to produce the driving force necessary to drive the oil through the formation to the production wells.

These and other objects of the invention will become apparent to those skilled in the art from the following commentary and accompanying drawings.

The drawings are diagrammatic representations of developed oil fields showing a plurality of wells wherein.

The formation represented and the wells shown are for illustrative purposes only, and the invention is not to be limited thereto in that other formations and other well patterns are readily susceptible to having the principles of the herein-disclosed invention applied to them.

Figure 2:
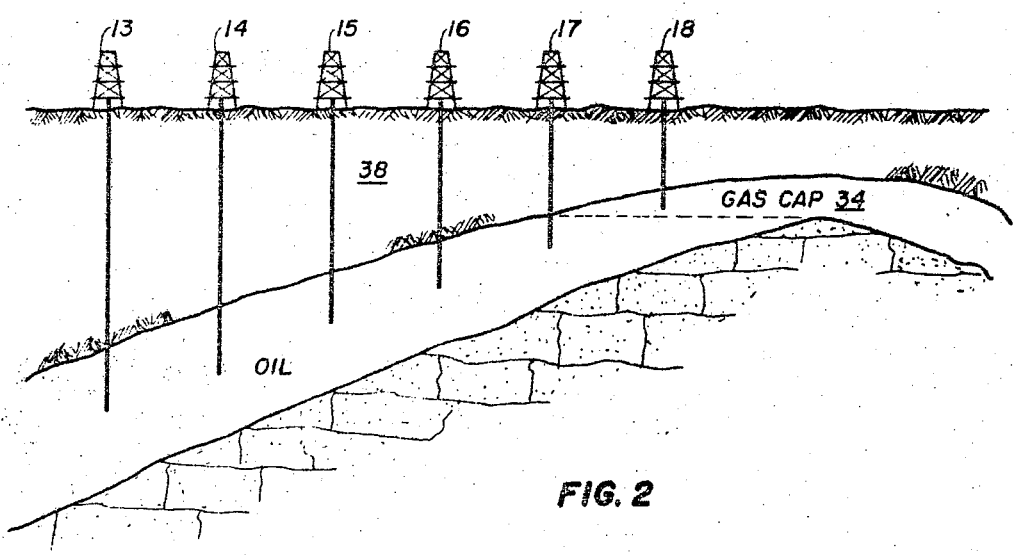
FIGURE 2 shows a cross section view taken at a plane 2—2 of FIGURE 1.
Figure 1:
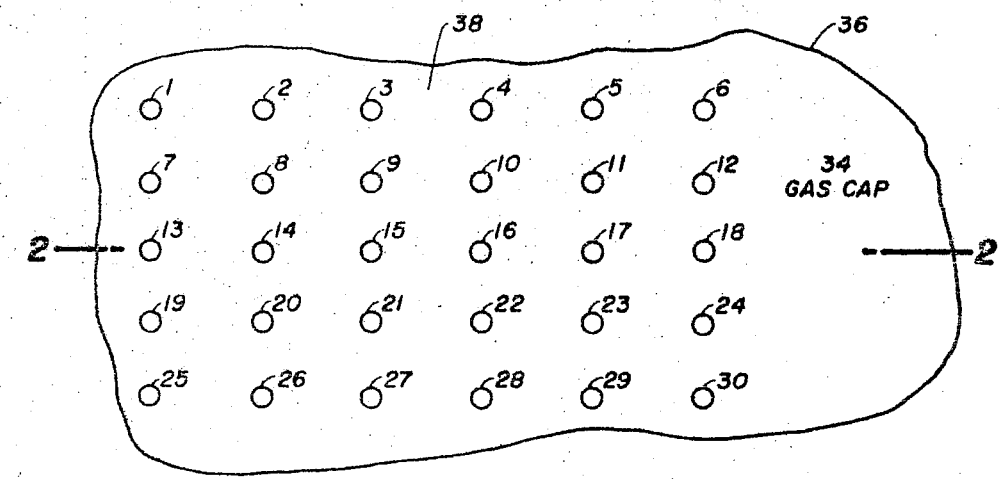
FIGURE 1 depicts a plan view of the field showing the relative locations of wells for the injection of water to separate the oil-bearing portion of the formation from the gas-bearing portion of the formation, wells for the production of oil, and wells for the injection of solvent in accordance with the principles of the instant invention.

Referring specifically to FIGURE 1, a row of fluid or water injection wells 6, 12, 18, 24 and 30 have been placed at the periphery of a gas cap 34, and water or other fluid is injected through these wells to curtail the migration of the formation gas towards the open producing wells 2, 8, 14, 20 and 26 (although it is at once readily apparent that well 14 could be the sole open producer). The injection of water in the particular region indicated forms a water block which effectively prevents the gas cap from expanding into the oil-bearing area of the formation. Line 36 defines the gas- and oil-bearing area of the formation. As water injection continues, a portion of the flood water displaces the reservoir oil contained in the interstices of the formation 38, driving the displaced oil towards any one or all of wells 2, 8, 14, 20 and 26. The continuous flood of water soon displaces most of the oil contained in the more porous strata and continued injection of the water produces little additional oil. Any attempt to practice conventional solvent recovery techniques under these conditions is ineffective since the solvent is swept up by the water channeling through the high permeability streaks, which are devoid of oil, and is subsequently produced in the production wells with very little, if any, oil.

Now, therefore, in accordance with the practice of this invention, water is produced from the plurality of wells 4, 10, 16, 22 and 28 surrounding, and upstream of, alternate injection wells 27, 15 and 3, and from the remaining wells 9 and 21 in line with wells 27, 15 and 3, while solvent is injected into the injection wells 27, 15 and 3 until traces of the solvent begin to appear in the open wells 9 and 21, thereby indicating that a band of solvent extends substantially across the formation. Once solvent is detected in the production from wells 9 and 21, these wells are shut in and solvent injection into the alternate wells is terminated. Thereafter, a fluid driving material, such as air, water, carbonated water, natural gas, etc., may be injected after the solvent. However, in the preferred method, producing wells 4, 10, 16, 22 and 28 are shut in, water injection into wells 6, 12, 18, 24 and 30 is terminated, and the gas cap in formation area 34 is allowed to expand into the oil-bearing portion of the reservoir 38 to drive the fluids entrained in the reservoir, that is, oil, water and the solvent band, towards open producing wells 2, 8, 14, 20 and 26.

In producing oil from the producing wells, and in maintaining formation conditions conducive to effecting high recoveries, it will be necessary generally to maintain within the formation or reservoir a pressure sufficiently high to insure miscibility between the gas contained in the gas cap area of the formation and the solvent injected into the alternate injection wells. Ordinarily, the pressures existent in the reservoir will be sufficiently high to maintain this miscibility, which is essential to prevent undue fingering of the gas through the solvent band or bank. In other instances, it may be necessary to convert the heretofore water injection wells 6, 12, 18, 24 and 30 again to water injection wells or other fluid injection wells to maintain the necessary pressure in the reservoir. It is quite obvious that other wells penetrating the formation may be used to increase the pressure in the formation so that miscibility of the gas and solvent is maintained; for instance, any one or all of wells 5, 11, 17, 23 and 29 could be used.

In the practice of this invention, water is produced from the plurality of wells 4, 10, 16, 22, 28 and the remaining wells in line with the alternate injection wells 9 and 21, thereby creating a zone of low hydrostatic pressure, relative to the solvent injection pressure, in the portion of the reservoir upstream of the solvent injection wells. This permits the injected solvent to flow radially from the injection wells towards the producing wells 9 and 21, and establishes a band of solvent substantially coextensive with the formation. While a pressure gradient is created by producing water from the wells within the injection well area, a portion of the flood water injected into the first row of wells, i.e., wells 6, 12, 18, 24 and 30 in the vicinity of gas cap 34, is not produced from the reservoir by means of the producing wells 4, 10, 16, 22, 28, 9 and 21. The portion not produced is permitted to drive the solvent through the formation according to one embodiment of the invention, thereby flushing out additional oil and driving solvent and oil to the production well 14, downstream from the solvent injection wells. Wells 5, 11, 17, 23, 29, 1, 7, 13, 19 and 25 inclusive designate closed or shut in wells which previously were, or subsequently will be, either oil-producing, water-producing or solvent injection wells. In the practice of this invention it is only necessary that water be produced from wells in line with and upstream of the solvent injection wells such that a solvent band is established substantially across the reservoir.

After a portion of the reservoir has been produced using the methods of the hereindisclosed invention, the procedure may be practiced upon the remaining rows or sets of wells so that the entire field can be produced. In such an embodiment, the water injection wells 6, 12, 18, 24 and 30 still serve as water injection wells, with the injection of water being continued to inhibit migration of the free gas 34 into area 38 and towards open producing wells. The wells 5, 11, 17, 23 and 29 continue to be shut in while wells 4, 10, 16, 22 and 28 now are also shut in. Wells 2, 14 and 26 then serve as alternate injection wells while wells 8, 20, 3, 9, 15, 21 and 27 serve as those wells from which fluids are produced as in the aforedescribed example. In similar fashion, the same procedure can be employed across the field in a lateral fashion. The type of subterranean formation shown, the number of wells indicated, and the particular pattern of injection and producing wells shown, are merely used for describing the invention, and are not to be taken as limitations. Most field-wide applications of the invention will be conducted where a number of producing wells are made available so as to take advantage of the conventional five, seven or nine spot pattern of secondary oil recovery.

Ideally, the invention is practiced upon a formation wherein the dip of the formation is not greater than about 15°, so as to gain some advantage due to the gravity flow of water within the formation. That is, ideally, the formation will form an angle of not greater than 15° with a horizontal plane taken through the reservoir, i.e., a plane parallel to the mean surface of the earth.

When used in this description, the solvents contemplated, which are to be driven through the reservoir include, but are not limited to natural gas, liquefied hydrocarbons such as LPG, $C_1$–$C_{14}$ hydrocarbons such as propane, alcohol, carbon dioxide and the lower-boiling mineral oil fractions such as gasoline and kerosene. In the embodiment wherein the gas from the gas cap portion of the area does not constitute the principal driving force to drive the solvent from the injection wells toward the producing wells, the fluids that may be injected after the solvent include, but are not limited to, thickened water, carbonated water, surfactant solutions, gas, etc., and combinations thereof.

The methods of water and solvent injection, as well as the type of solvent employed, are within the skill of one working in the art and are outside the scope of this invention. The pressures involved, as earlier indicated, must be of sufficient magnitude to maintain some degree of miscibility between the solvent and the particular principal driving fluid utilized, whether it be the normally existent gas in the gas cap or an additionally injected driving fluid.

As a specific example of the disclosed invention, an oil field in which a free gas cap exists is suitably provided with a number of wells which can be either injection or producing wells. The line of wells located peripherally of the gas-oil interface is used to inject 1,000 barrels of water per well per day. The said injected water separates the oil-bearing portion of the reservoir from the gas-bearing portion. Propane is injected downstream from the water injection wells into alternate wells in one row provided for said solvent injection, and the remaining wells of the row of wells in which the injection wells are located are allowed to produce fluids, as are the wells in the row upstream of, but adjacent to, the alternate injection wells. The propane injection is carried out under a pressure of about 1200 p.s.i., sufficient to maintain miscibility between the injected propane and the gas in the gas cap area. The solvent injection continues until a trace of solvent begins to appear at the remaining wells in the row of wells in which the injection wells are located, thereby signifying that a band of propane exists substantially coextensive with the reservoir. Propane injection is then terminated, and the wells located downstream of the injection wells are permitted to produce reservoir fluids. At the termination of propane injection, the introduction of water upstream of the production well, at the oil-gas interface, is terminated, thereby allowing gas-cap gas to migrate from the gas cap area into the oil zone and to drive the bank of propane lying between the injection wells and the production wells, thereby displacing oil towards the open production wells. A volume of gas-cap gas equal to 5–10 times the volume of propane injected into the alternate injection wells is allowed to migrate out of the gas cap area and to move into the oil-bearing formation, after which water injection into the oil-gas interface is again resumed to complete the oil recovery process.

The embodiments of the invention in which an exclusive property or privilege is claimed are defined as follows:

1. In a subterranean oil- and gas-bearing formation penetrated by rows of wells, the method of recovering substantially all of the oil and a minor portion of the gas, comprising the steps:

(a) injecting water at the gas-oil interface in an amount sufficient to prevent the migration of the gas from the gas-bearing portion of said formation into the oil-bearing portion;

(b) selecting alternate wells in one of the rows as injection wells downstream from the point of water injection;

(c) selecting a plurality of wells, in line with, upstream from and adjacent to said injection wells;

(d) selecting at least one well downstream from said injection wells as a production well;

(e) producing a portion of the water injected at the oil-gas interface from the plurality of wells selected upstream of and adjacent to said injection wells;

(f) simultaneous with step (e);

(1) injecting into said injection wells a petroleum solvent in an amount sufficient to form a band of solvent between the injection wells and the remaining wells in said row in which said injection wells are located;

(2) producing fluids from the remaining wells of said row of wells in which said alternate injection wells are located until a trace of said solvent is detected in the effluent from said remaining wells, and thereafter shutting in said remaining wells;

(g) recovering oil, solvent, water and gas from said production well.

2. The method in accordance with claim 1 wherein steps (a) and (e) are terminated after step (f) and said gas is allowed to migrate into said oil-bearing formation to drive fluids to the production well.

3. The method in accordance with claim 2 wherein water injection into the formation at the original water injection wells is resumed, after a volume of gas approximating 5 to 10 times the volume of solvent injected into the injection wells has been recovered at the production well.

4. The method in accordance with claim 2 wherein additional water injection at the oil-gas interface is resumed after the migration of a portion of said gas into said oil-bearing formation, the portion of said gas being sufficient to form a miscible displacement phase with said solvent ahead of said additionally injected water.

5. The method in accordance with claim 1 wherein a driving fluid is additionally injected into said injection wells immediately subsequent to the solvent.

6. The method in accordance with claim 5 wherein said solvent is selected from the group consisting of liquefied hydrocarbons, kerosene, gasoline, natural gas, alcohols, carbon dioxide and the lighter fractions of mineral oil.

7. The method in accordance with claim 6 wherein said driving fluid is selected from the group consisting of air, water, carbonated water and natural gas.

8. The method in accordance with claim 5 wherein said solvent is propane and the pressure in said formation is maintained sufficiently high so as to insure miscibility between said propane and said gas.

9. The method in accordance with claim 1 wherein said oil-bearing formation has a dip of less than about 15° with respect to a horizontal plane taken through said formation.

10. In a subterranean formation characterized as having a gas cap and an oil-bearing formation of not greater than 15° dip from a reference horizontal plane passing through said gas cap, said formation being penetrated by rows of wells, the method of recovering substantially all of the oil and a minor portion of the gas, comprising the steps:

(a) injecting an aqueous solution at the gas-oil interface in an amount sufficient to inhibit the migration of the gas from said gas cap into said oil-bearing formation;

(b) selecting alternate wells in one of the rows as injection wells downstream from the point of aqueous solution injection;

(c) selecting a plurality of wells, in line with, upstream from and adjacent to said injection wells;

(d) selecting at least one well downstream from said injection wells as a production well;

(e) producing a portion of the aqueous solution injected at the oil-gas interface from the plurality of wells selected upstream of and adjacent to said injection wells;

(f) approximately simultaneous with step (e):

(1) injecting propane through said injection wells into said formation under a pressure sufficient to make same miscible with said gas and in an amount sufficient to form a band of propane between the injection wells and the remaining wells in said row in which said injection wells are located, (2) producing fluids from the remaining wells of said row of wells in which said alternate injection wells are located until a trace of said propane is detected in the effluent from said remaining wells, and thereafter shutting in said remaining wells, (g) recovering oil, propane, aqueous solution and gas from said production well.

References Cited by the Examiner

UNITED STATES PATENTS 2,924,276 2/1960 Heilman et al. _____ 166—11
3,113,616 12/1963 Dew et al. _____ 166—9

FOREIGN PATENTS 726,72 3/1955 Great Britain.

CHARLES E. O'CONNELL, *Primary Examiner.*
STEPHEN J. NOVOSAD, *Examiner.*